US008428205B2

(12) United States Patent
Chang et al.

(10) Patent No.: US 8,428,205 B2
(45) Date of Patent: Apr. 23, 2013

(54) METHODS FOR CONTROLLING A MAIN CLOCK SOURCE SHARED BETWEEN DIFFERENT WIRELESS COMMUNICATIONS MODULES AND APPARATUSES USING THE SAME

(75) Inventors: Liang-Cheng Chang, Hsinchu (TW);
Ming-Jie Yang, Tainan County (TW);
Wei-Lun Wan, Hsinchu (TW);
Juei-Ting Sun, Kaohsiung (TW);
Hong-Kai Hsu, Taipei County (TW);
Wei-Ning Chien, Kaohsiung (TW)

(73) Assignee: Mediatek Inc., Hsin-Chu (TW)

( * ) Notice: Subject to any disclaimer, the term of this patent is extended or adjusted under 35 U.S.C. 154(b) by 443 days.

(21) Appl. No.: 12/719,088

(22) Filed: Mar. 8, 2010

(65) Prior Publication Data

US 2011/0075778 A1 Mar. 31, 2011

Related U.S. Application Data

(60) Provisional application No. 61/246,564, filed on Sep. 29, 2009.

(51) Int. Cl.
*H04L 7/00* (2006.01)

(52) U.S. Cl.
USPC .......................................................... 375/354

(58) Field of Classification Search .................. 375/132, 375/224, 225, 316, 354, 356, 362, 365, 371; 331/17, 18, 172
See application file for complete search history.

(56) References Cited

U.S. PATENT DOCUMENTS

| 6,140,883 | A | 10/2000 | Thomas |
| 7,656,235 | B2 | 2/2010 | Yuan et al. |
| 2002/0038435 | A1* | 3/2002 | Akamatsu et al. ............ 713/600 |
| 2002/0181459 | A1* | 12/2002 | Ohta et al. .................... 370/389 |
| 2006/0028284 | A1 | 2/2006 | Marton |
| 2007/0025316 | A1* | 2/2007 | Yamasaki et al. ............ 370/346 |
| 2008/0001681 | A1* | 1/2008 | Yuan et al. .................... 331/172 |
| 2009/0161806 | A1* | 6/2009 | Ananny et al. ................ 375/354 |
| 2009/0201092 | A1 | 8/2009 | Yuan et al. |
| 2009/0212877 | A1* | 8/2009 | Ogasawara ............. 331/116 M |

FOREIGN PATENT DOCUMENTS

| CN | 1282460 | 1/2001 |
| CN | 1832351 | 9/2006 |

OTHER PUBLICATIONS

German language office action dated Mar. 21, 2011.
English language translation of German office action, Jun. 10, 2011.
English language translation of abstract of CN 1832351 (published Sep. 31, 2006).

* cited by examiner

*Primary Examiner* — David C. Payne
*Assistant Examiner* — Syed Haider
(74) *Attorney, Agent, or Firm* — McClure, Qualey & Rodack, LLP

(57) ABSTRACT

A communications apparatus is provided. A first wireless communications module provides a first wireless communications service and communicates with a first communications device in compliance with a first protocol. A second wireless communications module provides a second wireless communications service and communicates with a second communications device in compliance with a second protocol. A clock source is shared by the first and the second communications modules and provides a reference clock to the first and the second communications modules. The first wireless communications module detects a request from the second wireless communications module for activating the clock source, determines whether the reference clock has been stably generated by the clock source, and adjusts an electrical characteristic of the clock source to facilitate the reference clock output from the clock source to achieve a target frequency when the reference clock has not been stably generated.

21 Claims, 15 Drawing Sheets

METHODS FOR CONTROLLING A MAIN CLOCK SOURCE SHARED BETWEEN DIFFERENT WIRELESS COMMUNICATIONS MODULES AND APPARATUSES USING THE SAME

CROSS REFERENCE TO RELATED APPLICATIONS

This application claims the benefit of U.S. Provisional Application No. 61/246,564 filed Sep. 29, 2009, and entitled "Methods for controlling a main clock source shared between different wireless communications modules and apparatuses using the same". The entire contents of which are hereby incorporated by reference.

BACKGROUND OF THE INVENTION

1. Field of the Invention

The invention relates to a method and an apparatus for controlling a main clock source, and more particularly to a method and an apparatus for controlling a main clock source shared between different wireless communications modules in a coordinated manner.

2. Description of the Related Art

With the development of wireless communications technology, mobile electronic devices may be provided with more than one wireless communications service, such as Bluetooth, Wireless Fidelity (WiFi), Worldwide Interoperability for Microwave Access (WiMAX) wireless communications service, and so on. However, the clock frequencies required by the wireless communications services are generally different. When using multiple clock sources, each for a corresponding wireless communications service, in the mobile electronic device, battery power consumption is increased. Therefore, a method and an apparatus for controlling a main clock source shared between different wireless communications modules is highly required to reduce battery power consumption.

BRIEF SUMMARY OF THE INVENTION

Communications apparatuses and methods for controlling a clock source shared between different wireless communications modules are provided. An embodiment of a communications apparatus comprises a first wireless communications module, a second wireless communications module and a clock source. The first wireless communications module provides a first wireless communications service and communicates with a first communications device in compliance with a first protocol. The second wireless communications module provides a second wireless communications service and communicates with a second communications device in compliance with a second protocol. The clock source is shared by the first and the second communications modules and provides a reference clock to the first and the second communications modules. The first wireless communications module detects a request from the second wireless communications module for activating the clock source, determines whether the reference clock has been stably generated by the clock source, and adjusts an electrical characteristic of the clock source to facilitate the reference clock output from the clock source to achieve a target frequency when the reference clock has not been stably generated.

An embodiment of a method executed by a first wireless communications module for controlling a clock source shared with at least a second wireless communications module comprises: detecting a request from the second wireless communications module for activating the clock source; determining whether a reference clock has been stably generated by the clock source; and avoiding adjusting an electrical characteristic of the clock source when the reference clock has been stably generated, wherein the adjustment to the electrical characteristic of the clock source facilitates the reference clock output from the clock source to achieve a target frequency.

Another embodiment of a communications apparatus comprises a clock source providing a reference clock, a first wireless communications module comprising an interface and a micro controller unit coupled to the interface, and a second wireless communications module. The second wireless communications module notifies the first wireless communications module that the clock source has been requested for activating via the interface of the first wireless communications module. The micro controller unit detects the reference clock, determines whether to adjust an electrical characteristic of the clock source to facilitate the reference clock to achieve a target frequency with reference to the detected reference clock after receiving the notification from the second wireless communications module, and adjusts the electrical characteristic of the clock source in terms of the determination.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
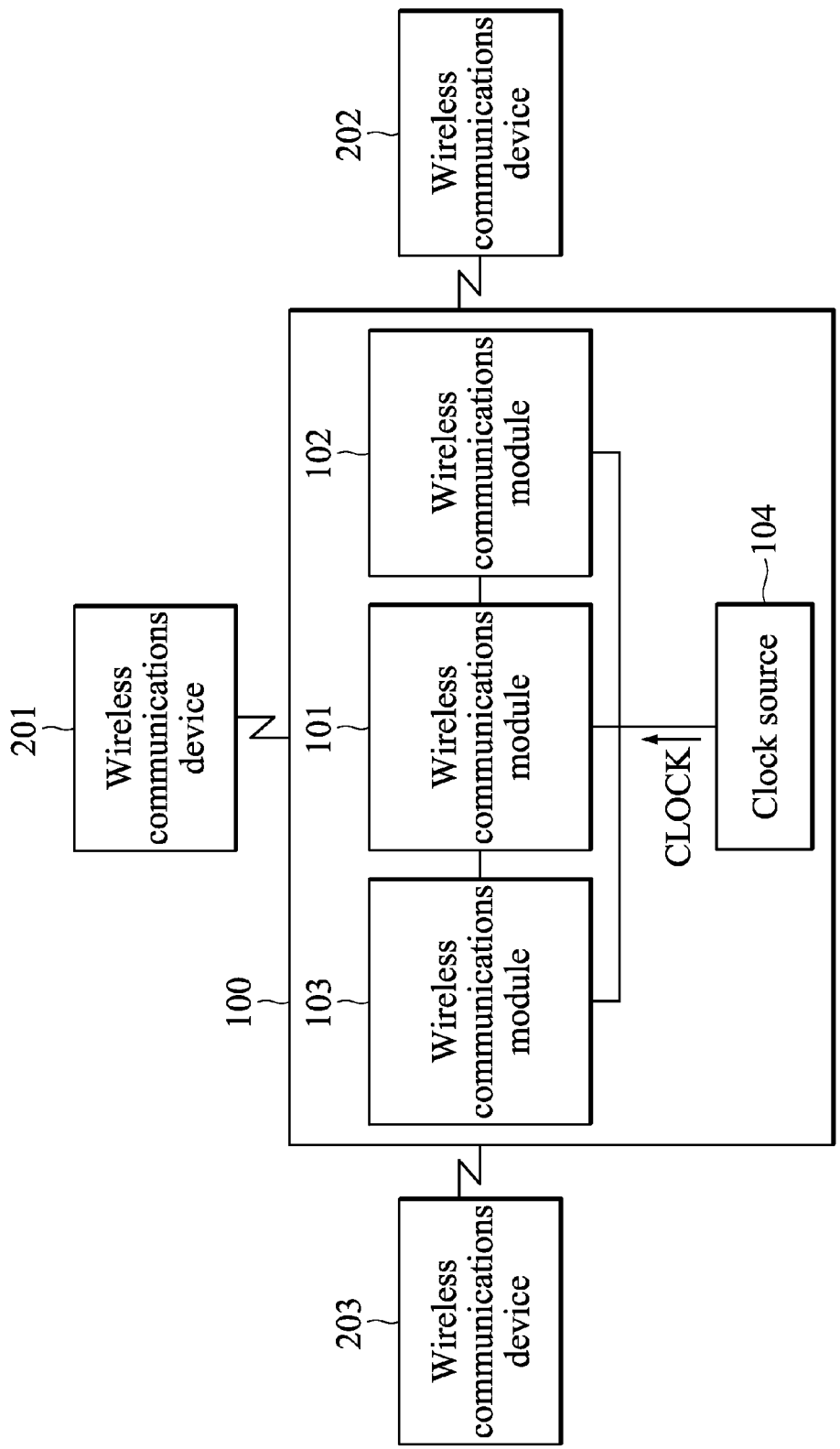
FIG. 1 shows a schematic diagram of a communications system according to an embodiment of the invention.

FIG. 1 shows a schematic diagram of a communications system according to an embodiment of the invention. A mobile electronic device 100 may be installed in a notebook, a cellular phone, a portable gaming device, a portable multimedia player, a Global Positioning System (GPS), a receiver, or others. The mobile electronic device 100 may comprise a plurality of wireless communications modules 101 to 103, as shown in FIG. 1, to provide different wireless communications services. The wireless communications module 101 may communicate with a wireless communications device 201 in compliance with a specific protocol via the air interface. The wireless communications module 102 may communicate with a wireless communications device 202 in compliance with a specific protocol via the air interface. The wireless communications module 103 may communicate with a wireless communications device 203 in compliance with a specific protocol via the air interface. According to an embodiment of the invention, the wireless communications module 101 may be, for example, a GSM (Global System for Mobile Communications), WCDMA (Wideband Code Division Multiple Access), cdma2000, WiMAX (Worldwide Interoperability for Microwave Access), TD-SCDMA (Time Division Synchronous Code Division Multiple Access), LTE (Long Term Evolution), TD-LTE (Time Division Long Term Evolution) module, or the like, providing wireless telephony services, such as basic services, short message services (SMS), multimedia message services (MMS), supplementary services (SS), or others. The wireless communications module 102 or 103 may be a Bluetooth, ZigBee, WiBREE (Wireless BREE), WiFi, UWB (Ultra-WideBand), or GPS (Global Positioning System) module, or others.

According to an embodiment of the invention, the mobile electronic device 100 may further comprise a clock source 104, shared between the wireless communications modules 101 to 103, to provide a reference clock CLOCK. The frequency of the reference clock CLOCK may be, for example, 26 MHz, 15.36 MHz, 30.72 MHz, 32 MHz, or others. Note that those skilled in the art may also implement one or more than two wireless communications modules to connect to the wireless communications module 101 and share the clock source 104, and the invention should not be limited thereto. Additionally, it is to be understood that the wireless communications modules may be integrated into an SoC (system on chip) and connect therebetween by internal wires, or different but similar bus architectures, or others. Several embodiments for controlling the clock source 104 shared between the wireless communications modules are proposed and discussed in the following paragraphs.

Figure 2:
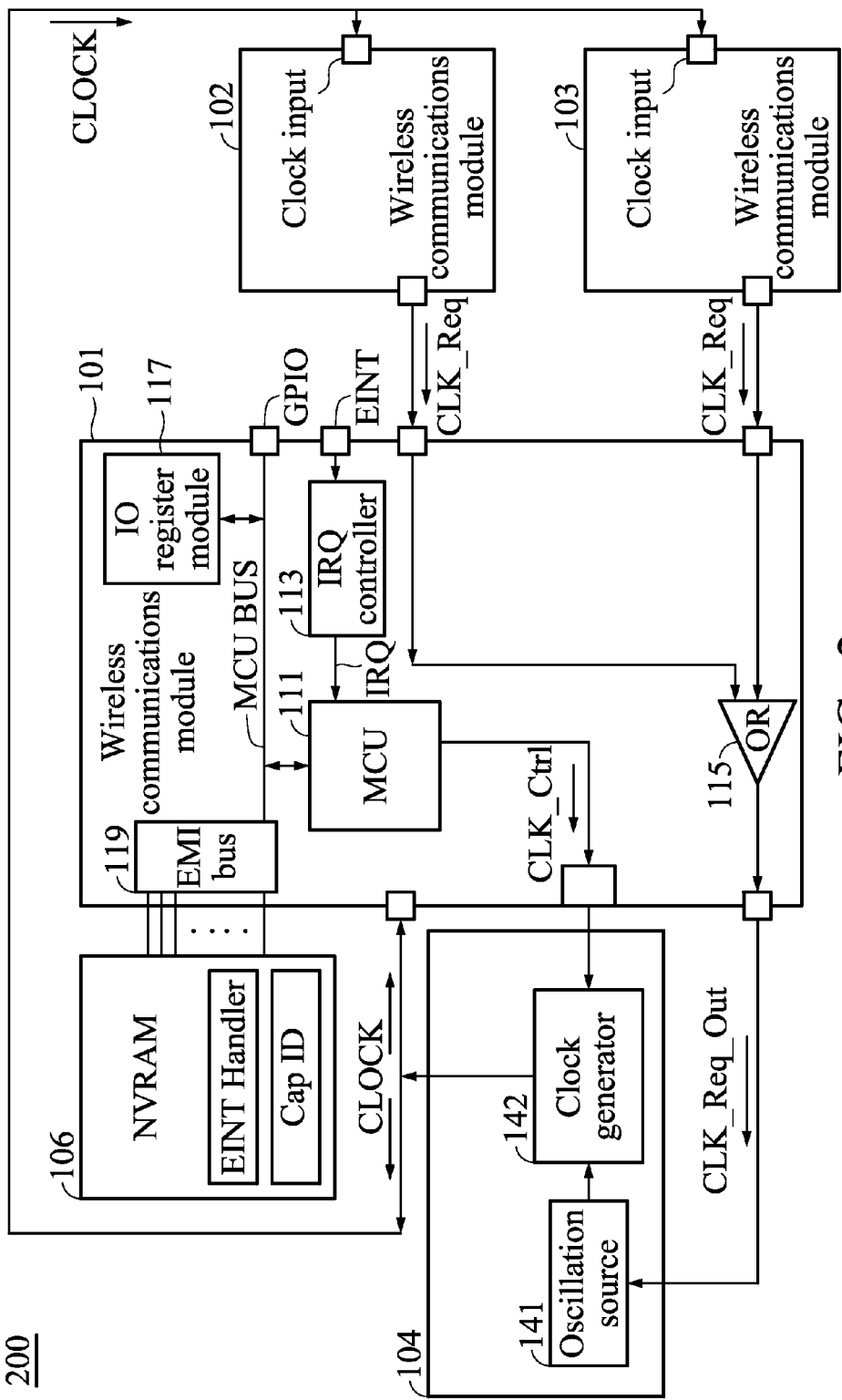
FIG. 2 shows a schematic diagram of a mobile electronic device according to a first embodiment of the invention.

FIG. 2 shows a schematic diagram of a mobile electronic device 200 according to a first embodiment of the invention. In the first embodiment of the invention, the clock source 104 is controlled by one wireless communications module without coordinating with different wireless communications modules 101 to 103. The clock source 104 may comprise at least an oscillation source 141 and a clock generator 142 to provide a clock signal as the reference clock CLOCK to different wireless communications modules for operations thereof. As previously discussed, the frequency of the reference clock CLOCK may be, for example, 26 MHz, 15.36 MHz, 30.72 MHz, 32 MHz, or others. The three wireless communications modules 101 to 103 may operate at different frequencies when they are in a busy mode (also called a wake-up mode). Any of the wireless communications modules may issue a request to activate the clock source 104 to provide the reference clock CLOCK thereto. According to an embodiment of the invention, the wireless communications module 101 may issue an internal clock request to activate the clock source 104 to provide the reference clock CLOCK when the wireless communications module 101 is going to enter or has entered a busy mode (also called a wake-up mode). According to another embodiment of the invention, the wireless communications module 101 may further receive the external requests CLK_Req from the wireless communications modules 102 and 103, collect the external requests by an OR gate 115, and output the collected result as the request CLK_Req_Out to the clock source 104. In the embodiments, the clock source 104 may be activated and the oscillation source 141 may start to oscillate in response to the request CLK_Req_Out. Note that the OR gate 115 may also be replaced with any other circuit or device performing substantially the same functions or achieving substantially the same results, and the invention should not be limited thereto.

As shown in FIG. 2, the wireless communications module 101 may comprise a micro controller unit (MCU) 111, an interrupt request controller (IRQ controller) 113, an IO register module 117 and an external memory interface (EMI) bus 119. As one of ordinary skill in the art will readily appreciate, the basic functions of the MCU, IRQ controller, IO register and the EMI are already well-known in the art and are omitted here for brevity. It is also to be understood that the MCU and related portions of a digital circuit are powered down to save battery power when the reference clock is disabled (or inactivated). According to the embodiments of the invention, the clock source 104 may be a VCXO (voltage-controlled crystal oscillator), a VCTXO (voltage controlled temperature compensated crystal oscillator), a DCXO (digitally controlled crystal oscillator), or others. The oscillation source 141 may use the mechanical resonance of a vibrating crystal of piezoelectric material to create an electrical signal with a precise frequency, and the clock generator 142 may accordingly provide a stable clock signal for digital integrated circuits of the wireless communications modules 101 to 103 for synchronization, and/or stabilize frequencies for radio transmitters and receivers installed in the wireless communications modules 101 to 103.

According to the embodiment of the invention, the MCU 111 is capable of adjusting certain electrical characteristic of the clock source 104, such as capacitance, voltage and the similar, via a control signal CLK_Ctrl to reduce power consumption and maintain reference clock frequency with specific precision, or others. In the embodiments, the capacitance of the clock source 104 may be adjusted to several levels denoted as "CapID values". As an example, a relatively smaller capacitance value indicates that a relatively smaller capacitance is provided so that the time required for the frequency of the reference clock to reach the target reference clock frequency would be relatively short. However, in the first embodiment of the invention, several drawbacks may occur, as shown in FIG. 3 or FIG. 4, when the wireless communications module 101 controls the clock source 104 without considering the operating statuses of the other wireless communications modules 102 and 103.

Figure 3:
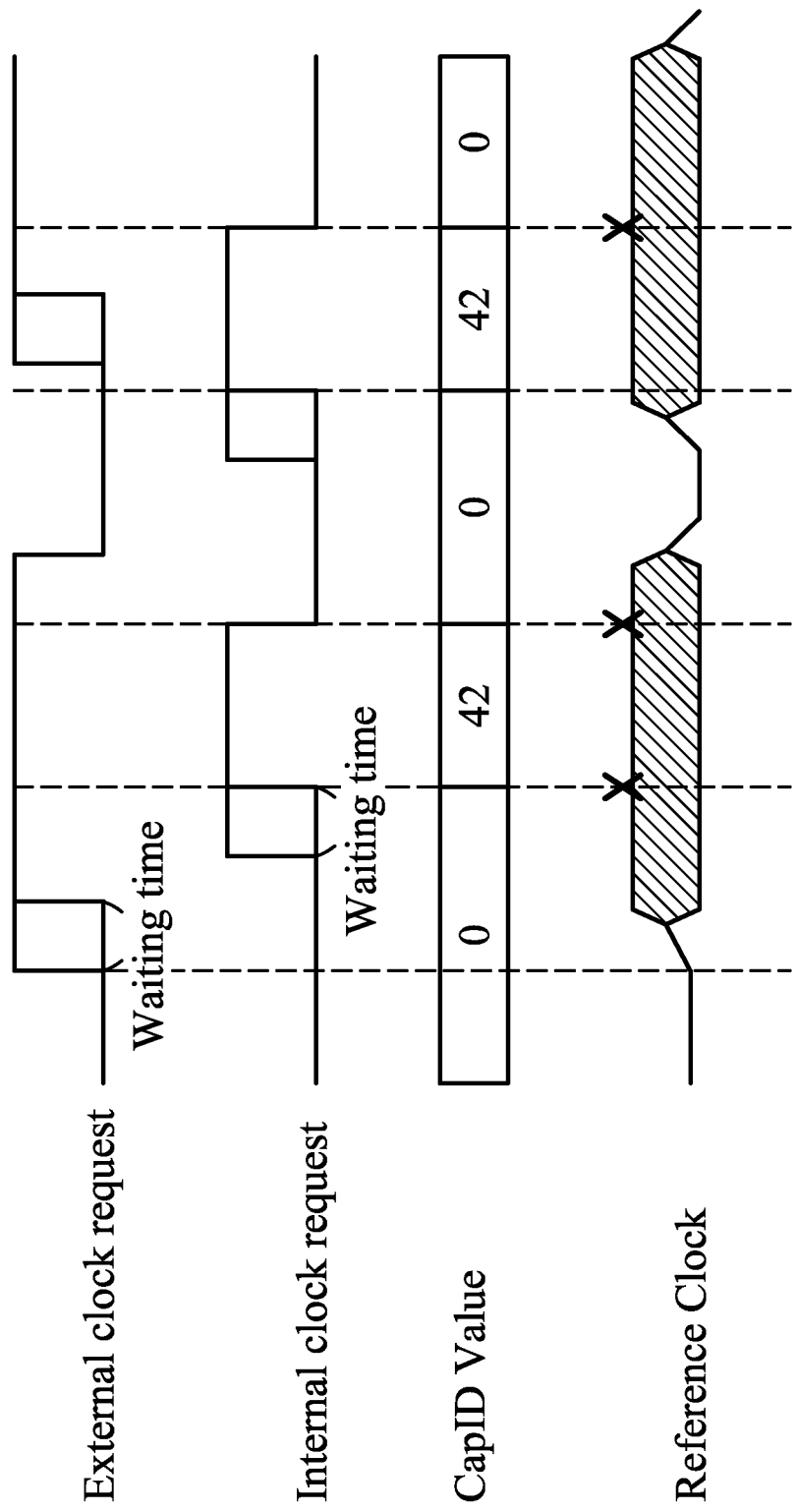
FIG. 3 shows corresponding waveforms of the clock requests, CapID values and the provided reference clock in an exemplary situation.
Figure 4:
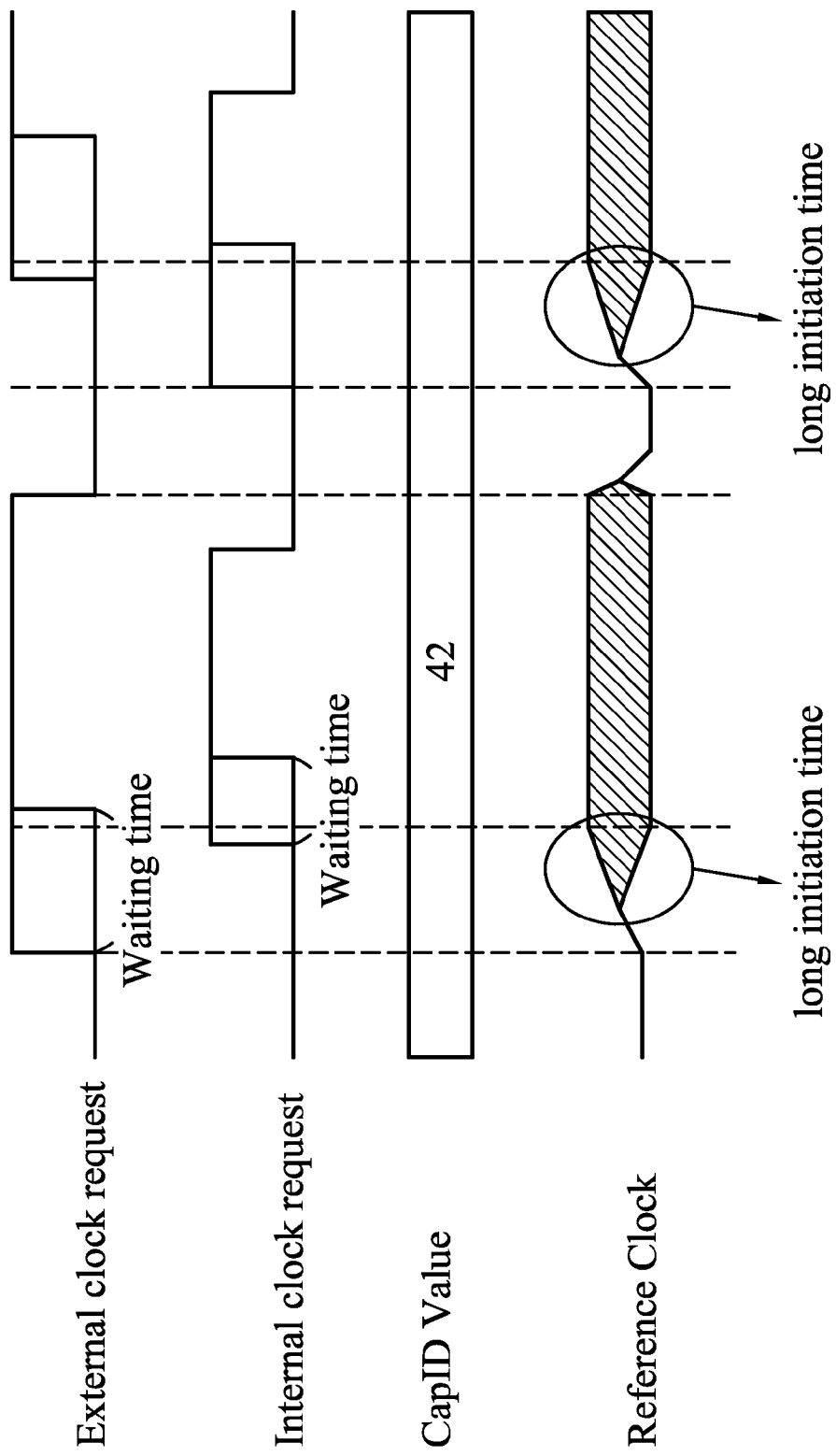
FIG. 4 shows corresponding waveforms of the clock requests, CapID values and the provided reference clock in another exemplary situation.

FIG. 3 shows corresponding waveforms of the clock requests, variations of CapID values and the provided reference clock in an exemplary situation. After receiving the external clock request CLK_Req from the wireless communications module 102 or 103, the wireless communications module 101 may pass the clock request, via the OR gate 105 or a similar circuit, to activate the clock source 104 to provide the reference clock CLOCK to the wireless communications module 102 or 103. During initiation, a relatively smaller capacitance (for example, CapID=0) of the clock source 104 may cause the output reference clock to reach a target frequency in a shorter time period than using a relatively larger capacitance. When the wireless communications module 101 wakes up and enters a busy mode, the clock source 104 may be started with the smallest amount of capacitance (for example, CapID=0), until reaching the target reference clock frequency (for example, 26 MHz). After that, the MCU 111 may adjust the capacitance to a calibrated level (for example, CapID=42) to yield a better performance (for example, +/−0.1 ppm clock drift). The mentioned adjustment to the capacitance of the clock source 101 may be referred to as a facilitating process to make the frequency of reference clock to achieve a target level. However, in an exemplary situation, as the clock source 104 has already been activated to provide clock to the wireless communications module 102 or 103 (e.g. a Bluetooth module), the capacitance adjustment triggered by the MCU 111 may dramatically change the output reference clock frequency to cause the operation of the second or the third wireless communications module to fail. FIG. 4 shows corresponding waveforms of the clock requests, variations of CapID values and the provided reference clock in another exemplary situation. In this situation, the MCU 111 may maintain the capacitance of the clock source 104 with the calibrated level (for example, CapID=42) without any further adjustments to avoid the mentioned problems. However, maintaining the capacitance of the clock source 104 consumes more battery power and may increase the time required for the oscillator to reach the target reference clock frequency. Therefore, a second embodiment of the invention is provided to solve the mentioned problems. Note that the first embodiment as shown in FIG. 2 and corresponding paragraphs are also a part of the invention developed during a design stage, and should not be regarded as the conventional technique.

Figure 5:
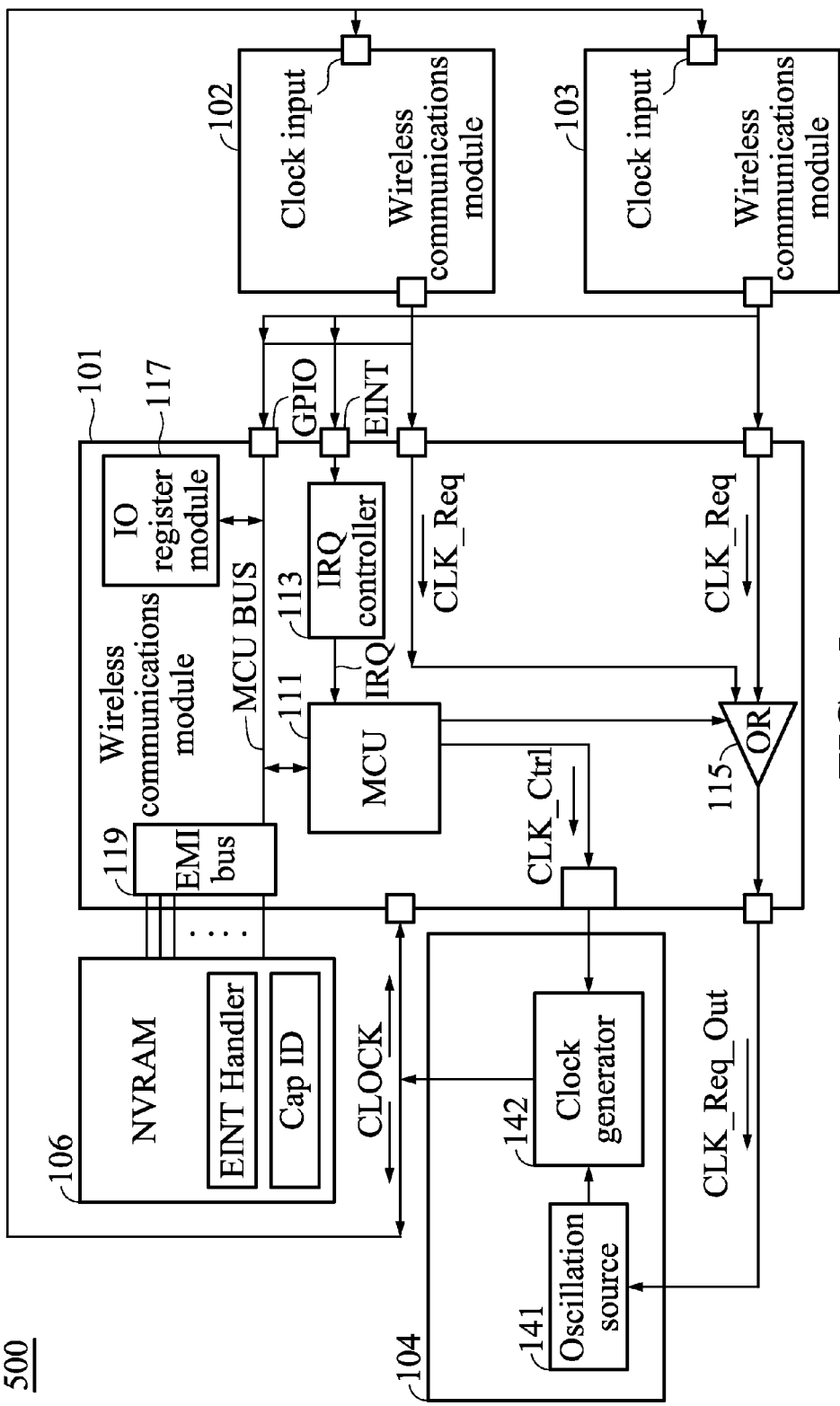
FIG. 5 shows a schematic diagram of a mobile electronic device according to a second embodiment of the invention.

FIG. 5 shows a schematic diagram of a mobile electronic device 500 according to the second embodiment of the invention. In the second embodiment of the invention, one wireless communications module controls the clock source 104 in a coordinated manner with consideration of the operating statuses of the other wireless communications modules. The fundamental hardware architecture and operation of the mobile electronic device 500 are similar to that of the mobile electronic device 200 shown in FIG. 2. Therefore, reference may be made to FIG. 2 with the corresponding paragraphs and repeated descriptions are omitted here for brevity. As illustrated previously, the wireless communications module 101 may send out an internal clock request to activate the clock source 104 to provide a reference clock, such as a 26 MHz, 15.36 MHz, 30.72 MHz, 32 MHz clock, or others, when the wireless communications module 101 is going to enter or has entered a busy mode. In order to facilitate coordination between the three wireless communications modules 101 to 103, the MCU 111 of the wireless communications module 101 may comprise one or more external interrupt (ENT) and/or general purpose input output (GPIO) connections to interface with the external wireless communications modules 102 and 103. According to the second embodiment of the invention, when the wireless communications module 102 or 103 wakes up and enters a busy mode, the wireless communications module 102 or 103 may issue the external clock request CLK_Req to activate the clock source 104, as well as, trigger an external interrupt (EINT) via an EINT interface or send a GPIO signal via a GPIO interface to notify the MCU 111 of the wireless communications module 101 that the clock source 104 has been requested for activating by another wireless communications module. The requests CLK_Req are collected by an OR gate 115 of the wireless communications module 101. The clock source 104 may be activated and the oscillation source 141 may start to oscillate in response to the request CLK_Req_Out output by the OR gate 115. Note that the OR gate 115 may be controlled and activated by the MCU 111 when the MCU 111 receives the EINT or GPIO signal. The OR gate 115 may also be replaced by any other circuit or device performing substantially the same functions or achieving substantially the same results, and the invention should not be limited thereto. Note also that the OR gate 115 may be alternatively implemented outside of the wireless communication modules, and the invention should not be limited thereto.

According to an embodiment of the invention, once detecting an EINT, the interrupt request (IRQ) controller 113 of the wireless communications module 101 may issue an IRQ to force the MCU 111 to load and execute an EINT handler containing a series of software codes. The executed EINT handler may adjust certain electrical characteristics of the main clock source 104, such as capacitance, voltage and the similar, to reduce power consumption, maintain reference clock frequency, or others, at relevant times. According to another embodiment of the invention, when detecting a GPIO signal via the GPIO interface, a relevant bit of an JO register 117 is set to indicate an asynchronous event triggered by the wireless communications module 102 or 103. The MCU 111 may periodically poll the bit of the JO register 117 to determine whether the clock source 104 has been activated by another outside wireless communications module. If so, a software routine is loaded and executed to adjust certain electrical characteristics of the clock source 104 at relevant times. The mentioned electrical characteristic adjustment of the clock source 104 may refer to a calibrated capacitance value "CapID" stored in an NVRAM (non-volatile random access memory) 106 of the mobile electronic device 500. Note that according to an embodiment of the invention, the ENT handler or software routine may also be stored in the NVRAM 106. Detailed description of the electrical characteristic adjustment of the clock source 104 will be illustrated in the following paragraphs.

Figure 6:
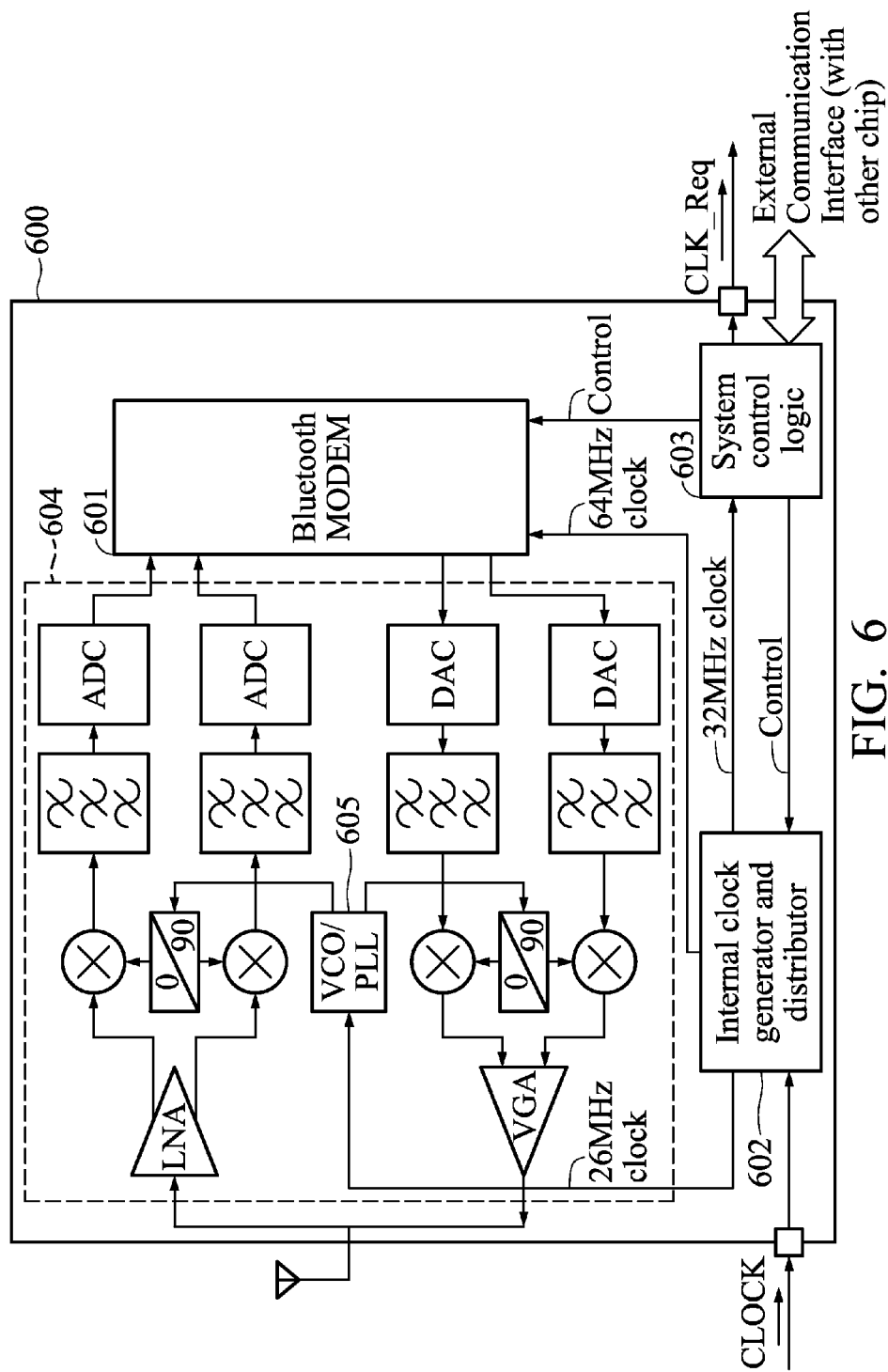
FIG. 6 shows the hardware architecture of a Bluetooth module according to an embodiment of the invention.

FIG. 6 shows the hardware architecture of a Bluetooth module 600 according to an embodiment of the invention. Bluetooth is an open wireless protocol for exchanging data over short distances from fixed and mobile devices, creating personal area networks. Bluetooth systems occupy a section of the 2.4 GHz Industrial, Scientific, and Medical (ISM) band, which is 83 MHz-wide. The Bluetooth module 600 may operate as a master device controlling a personal area network (PAN) and/or operate as a slave device being wirelessly connected to the master device. The Bluetooth module 600 uses an inquiry procedure to discover nearby devices, or to be discovered by devices in their locality. The procedure for forming connections is asymmetrical and requires that one Bluetooth device carries out a page (connection) procedure while the other Bluetooth device is connectable (page scanning.) The procedure is targeted, so that the page procedure is only responded to by one specified Bluetooth device. The connectable device uses a special physical channel to listen for connection request packets from the paging (connecting) device. This physical channel has attributes that are specific to the connectable device, hence only a paging device with knowledge of the connectable device is able to communicate on the channel. Both paging and connectable devices may already be connected to other Bluetooth devices in a piconet. Two types of connections may be used for communications between a master device and a slave device. They are SCO/ eSCO (synchronous connection oriented/extended synchronous connection oriented) links and ACL (asynchronous connection oriented) links. The execution of the above-mentioned and wireless data transceiving procedures are performed using a radio frequency (RF) module 604 and a Bluetooth MODEM 601. The reference clock CLOCK output from the clock source 104 is fed to an internal clock generator and distributor 602 of the Bluetooth module 600. The internal clock generator and distributor 602 may adjust the reference clock CLOCK to appropriate clock rates and drive the adjusted clock signals over a certain power level to the Bluetooth MODEM 601, a VCO/PLL (voltage-controlled oscillator/phase lock loop) 605 in the module 604 and a system control logic 603 for operations thereof. For example, the VCO/PLL 605 may utilize an adjusted clock signal of 26 MHz to stabilize frequencies for radio transmitters and receivers. According to an embodiment of the invention, the internal clock generator and distributor 602 may be regarded as a PLL frequency synthesizer operating in a low frequency. The internal clock generator and distributor 602 may output stable 64 MHz and 32 MHz clock signals to the Bluetooth MODEM 601 and a system control logic 603, respectively for synchronization therebetween. The system control logic 603 issues the external clock request CLK_Req, as well as, an EINT or a GPIO signal to the wireless communications module 101 when the Bluetooth module is going to enter or has entered a busy mode.

Figure 7:
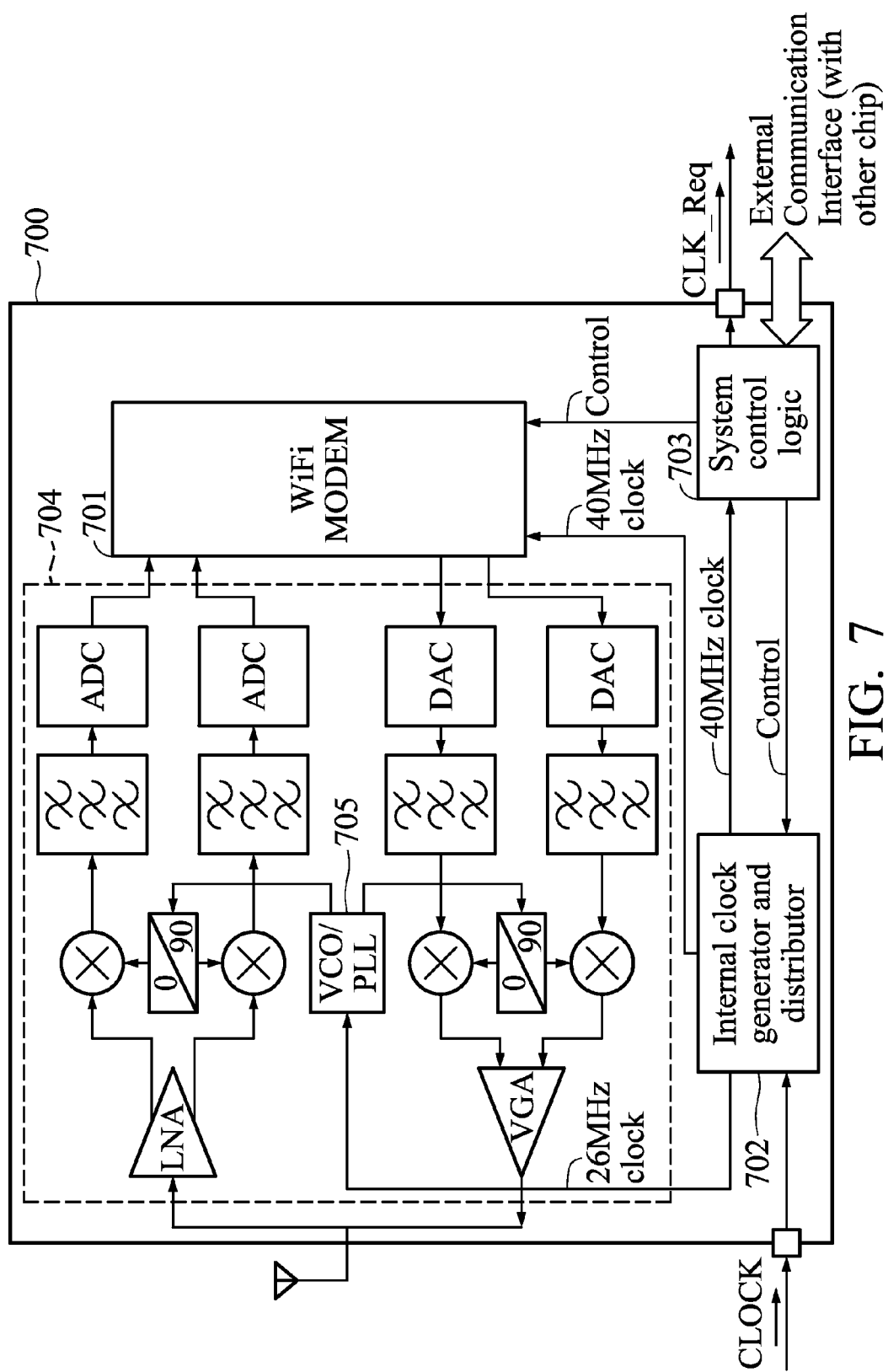
FIG. 7 shows the hardware architecture of a WiFi module according to an embodiment of the invention.

FIG. 7 shows the hardware architecture of a WiFi module 700 according to an embodiment of the invention. The WiFi module 700, also called an IEEE 802.11 module, a wireless local are network (WLAN) module, or others, may be wirelessly used to connect to the Internet to browse web pages, transceive e-mails, chat on-line, download and play multimedia content, or others. The WLAN is typically implemented as an extension to wired LANs within a building and can provide the final few meters of connectivity between a wired network and mobile or fixed devices. Most WLAN systems may operate in the 2.4 GHz license-free frequency band and have throughput rates of up to 2 Mbps. The WiFi module 700 connects users via an access point (AP) to the LAN. The AP typically receives, buffers, and transmits data between the WiFi module 700 and the wired network infrastructure. Each AP may support, on average, twenty devices and have a coverage varying from 20 meters in areas with obstacles (walls, stairways, elevators) and up to 100 meters in areas with clear lines of sight. The access process of the WiFi module 700 may involve the following three steps: active/ passive scanning, authentication and association performed via an RF module and a WiFi MODEM 701 thereof, enabling the WiFi module 700 to associate with an AP. Active scanning is used by the WiFi module 700 to scan surrounding wireless networks and locate a compatible one. Passive scanning is used by the WiFi module 700 to discover surrounding wireless networks by listening to beacon frames periodically sent by an AP. To prevent illegal access of a wireless network, authentication may be needed between the WiFi module 700 and an access controller (AC) managing all APs in a WiFi or between the WiFi and the associated AP. When the WiFi module 700 chooses a compatible network with a specified SSID and authenticates to an AP, it sends an association request frame to the AP. The AP sends an association response to the WiFi module 700 and adds the client's information to its database. An internal clock generator and distributor 702 of the WiFi module 700 receives the reference clock CLOCK generated by the clock source 104. The internal clock generator and distributor 702 may adjust the reference clock CLOCK to appropriate clock rates and drive the adjusted clock signals over a certain power level to a WiFi MODEM 701, a VCO/PLL 705 in the circuit 704 and a system control logic 703 for operations thereof. For example, the VCO/PLL 705 may utilize the adjusted clock signal of 26 MHz to stabilize frequencies for radio transmitters and receivers. According to an embodiment of the invention, the internal clock generator and distributor 702 may be regarded as a PLL frequency synthesizer operating in a low frequency. The internal clock generator and distributor 702 may output stable 40 MHz clock signals to both the WiFi MODEM 701 and a system control logic 703 for synchronization therebetween. The system control logic 703 issues an external clock request CLK_Req, as well as, an EINT or a GPIO signal to the wireless communications module 101 when the WiFi module 700 is going to enter or has entered a busy mode.

Figure 8:
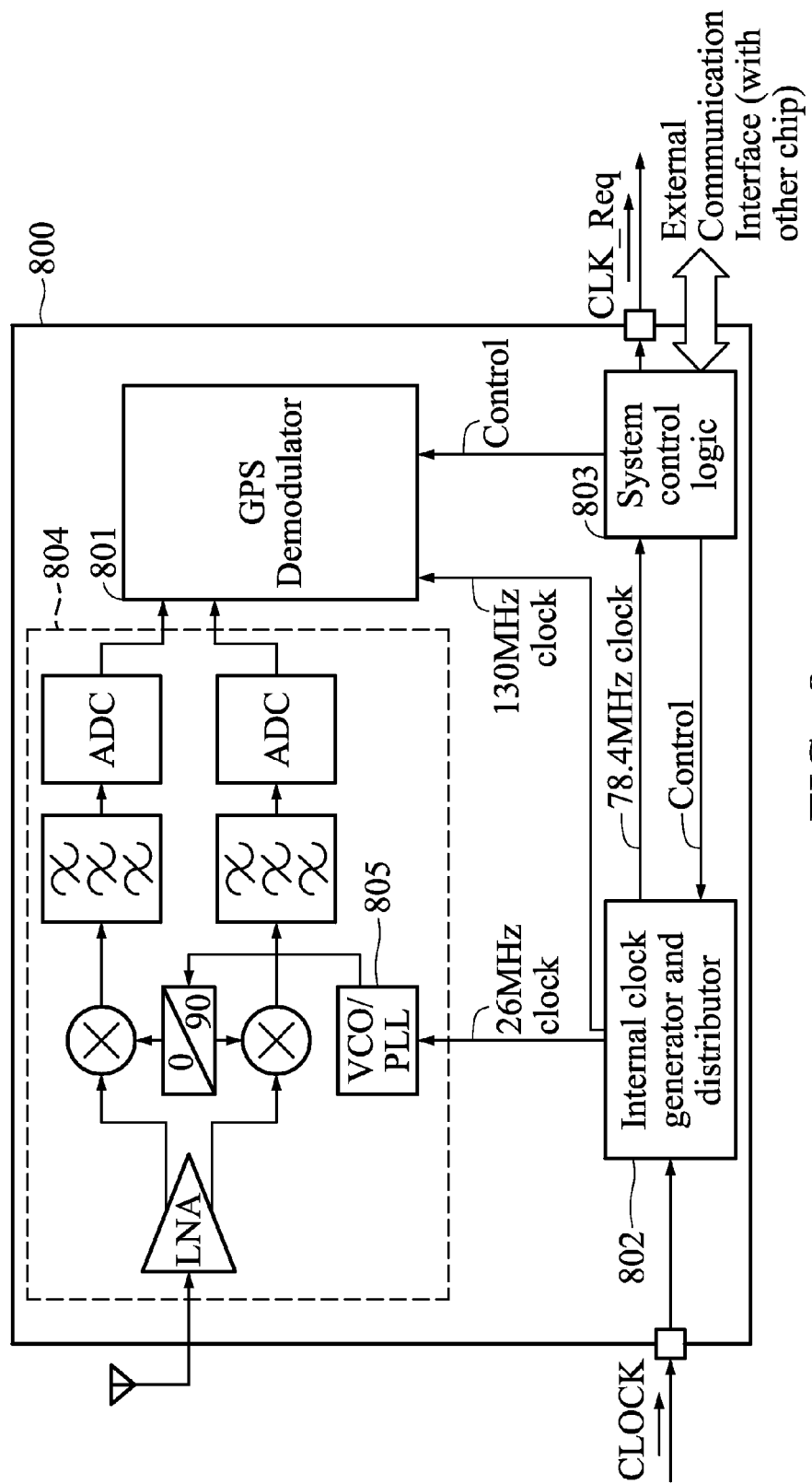
FIG. 8 shows the hardware architecture of a GPS module according to an embodiment of the invention.

FIG. 8 shows the hardware architecture of a GPS module 800 according to an embodiment of the invention. The GPS module 800 is capable of determining the latitude and longitude of a receiver on earth by calculating the time difference for GPS radio signals from different GPS satellites to reach the receiver. Specifically, the GPS module 800 calculates its position by measuring the distance between itself and three or more GPS satellites. Measuring the time delay between transmission and reception of each GPS radio signal gives the distance to each satellite, since the signal travels at a known speed. The signals also carry information about the satellites' location. Typically, by determining the position of, and distance to, at least three satellites, the GPS module 800 can compute its position using trilateration. An internal clock generator and distributor 802 of the GPS module 800 receive the reference clock generated by the main clock source 104. The internal clock generator and distributor 802 may adjust the reference clock CLOCK to appropriate clock rates and drive the adjusted clock signals over a specific power level to a GPS demodulator 801, a VCO/PLL 805 in the circuit 804 and a system control logic 803 for operations thereof. For example, the VCO/PLL 805 in the circuit 804 may utilize the adjusted clock signal of 26 MHz to stabilize frequencies for radio receivers. According to an embodiment of the invention, the internal clock generator and distributor 802 may be regarded as a PLL frequency synthesizer operating in a low frequency. The internal clock generator and distributor 802 may output stable 130 MHz and 78.4 MHz clock signals to the GPS demodulator 801 and a system control logic 803, respectively for synchronization therebetween. The system control logic 803 issues an external clock request CLK_Req, as well as, an EINT or a GPIO signal to the wireless communications module 101 when the GPS module 800 is going to enter or enters a busy mode.

Figure 9:
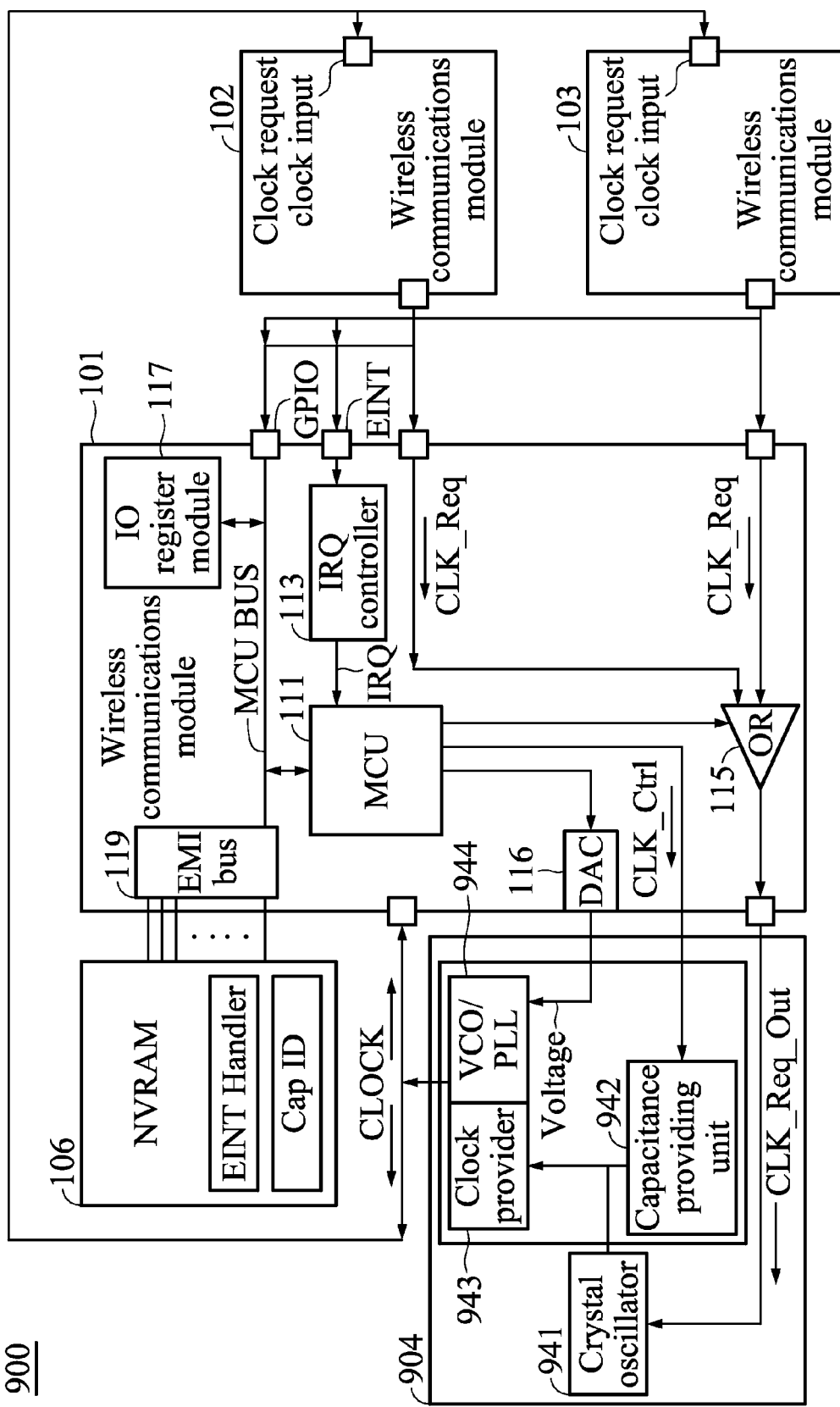
FIG. 9 shows a schematic diagram of a mobile electronic device according to an embodiment of the invention.

As described previously, the clock source 104 may be a VCXO, a VCTXO, a DCXO, or others. In the following paragraphs, some embodiments for controlling a VCXO, a VCTXO and a DCXO will be introduced. FIG. 9 shows a schematic diagram of a mobile electronic device 900 according to an embodiment of the invention. In the embodiment of the invention, the clock source 904 may be implemented in a VCXO containing at least a crystal oscillator 941, a capacitance providing unit 942 and a clock provider 943 with a VCO/PLL 944, as shown in the lower-left part of FIG. 9. The frequency of the VCXO may be varied by only typically a few tens of parts per million (ppm), because the high Q factor of the crystal oscillator allows pulling over only a small range of frequencies. The capacitance providing unit 942 of the VCXO can be adjusted by the executed EINT handler or software routine of the wireless communications module 101 to provide a specific amount of capacitance. The capacitance providing unit 942 may contain multiple capacitors each controlled by a voltage, and the voltage may be adjusted according to the received CapID value carried in the control signal CLK_Ctrl to provide a specific amount of capacitance. Alternatively, the capacitance providing unit 942 may contain multiple capacitors with switching devices, and the switching devices may be controlled according to the received CapID value carried in the control signal CLK_Ctrl to provide a specific amount of capacitance. Related references for controlling the capacitance providing unit 942 can be made to description of FIG. 2. The EINT handler or software routine may further contain an automatic frequency control (AFC) logic to adjust voltage (e.g. +/−0.1 ppm) to the VCO/PLL 944 of the VCXO 904 based on broadcasted signals from a base station, such as the wireless communications device 201, ensuring that precision of the frequency of the output reference clock CLOCK can be limited to a small range. In an AFC procedure, the clock rate or phase error between the clocks of the base station and the wireless communications module 101 are detected by the AFC logic. Thereafter, the voltage to the VCO/PLL 944 is adjusted accordingly so as to compensate for any frequency drift. Those skilled in the art may alternatively arrange the AFC logic outside of the EINT handler or software routine and embed it in another periodic activated subroutine. It is to be understood that the adjustment command to the VCO/PLL 944 may also be converted into a relevant voltage by a digital-to-analog converter (DAC) 116.

Figure 10A:
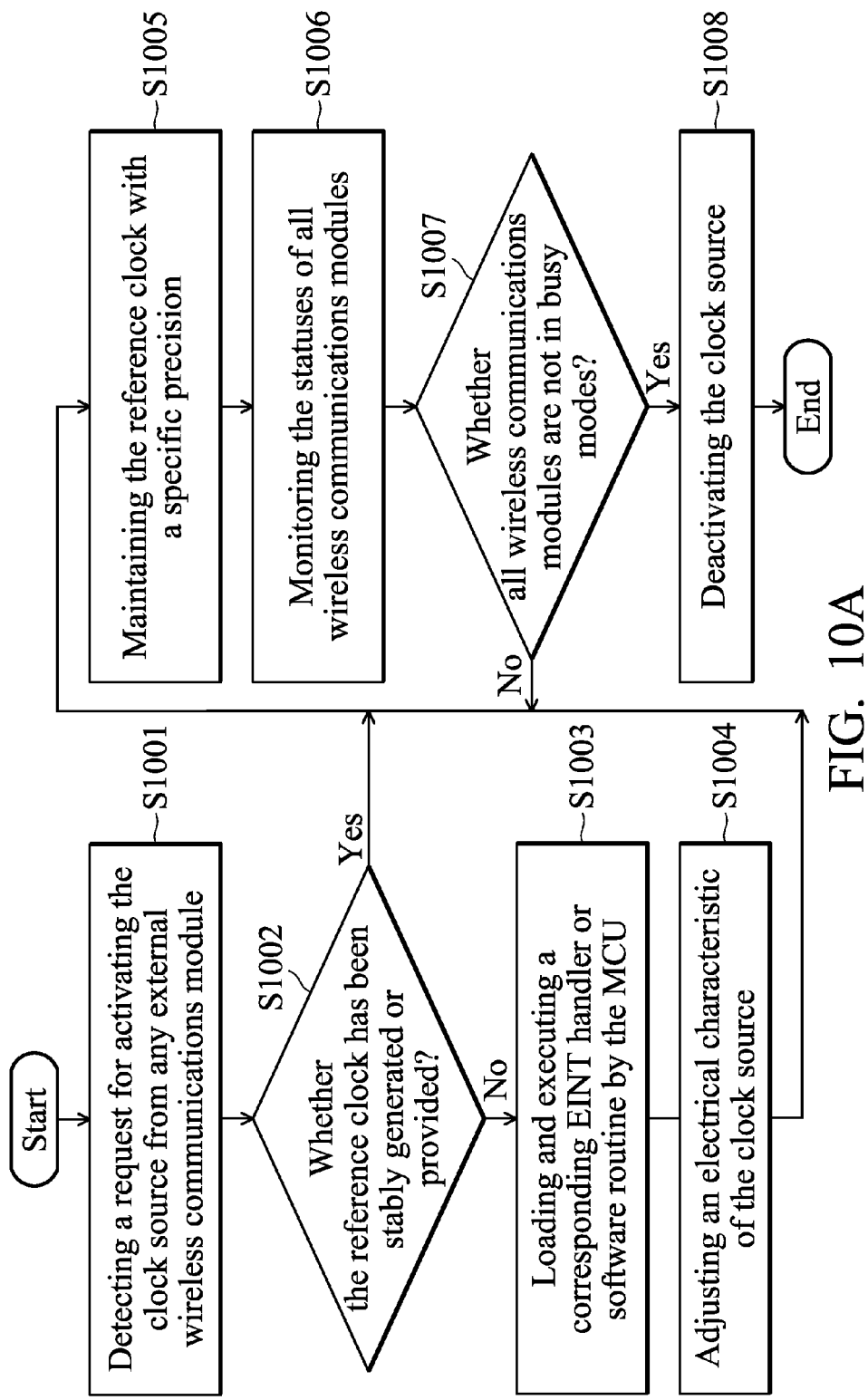
FIG. 10A shows the flow chart of a method for controlling the VCXO by the MCU of the first wireless communications module 101 according to an embodiment of the invention.

FIG. 10A shows the flow chart of a method for controlling the VCXO by the MCU 111 of the wireless communications module 101 according to an embodiment of the invention. After detecting a request to activate the clock source 904 from any external wireless communications module 102 or 103 via the EINT or GPIO interface (Step S1001), the MCU 111 of the wireless communications module 101 determines whether the reference clock has been stably generated or provided by the clock source 904 (Step S1002). When the reference clock has not been stably generated or provided by the clock source 904, meaning that the clock source has been initially activated by the external wireless communications module 102 or 103 to provide the reference clock, the MCU 111 loads and executes a corresponding EINT handler or software routine, or others, which is stored in the NVRAM (Step S1003). Next, the MCU 111 adjusts an electrical characteristic of the clock source 904 through the executed EINT handler or software routine by setting the CapID value to shorten the clock settling time (Step 1004). As an example, the MCU 111 of wireless communications module 101 may adjust the electrical characteristic of the clock source 904 by first adjusting a capacitance of the clock source 904 to a relatively smaller level to shorten the clock settling time for a time interval, and then increasing the capacitance of the clock source 904 to a target level to provide a stable reverence clock. It is to be understood that the CapID value may be carried in the control signals CLK_Ctrl or converted into a control voltage by the DAC to adjust the capacitance of the VCXO to a relevant level. When the reference clock has been stably generated or provided, meaning that the clock source has already provided a stable reference clock to any other wireless communications module (i.e. any wireless communications module other than the one that is making the request), the capacitance of the VCXO will not be changed and an AFC procedure may continue to maintain the reference clock with a specific precision until all of the wireless communications modules leave the busy modes (Step S1005). It is to be understood that the reference clock has been stably generated when it is output with the designated frequency varied within a small range. In the AFC procedure, the voltage of the VCXO is periodically adjusted based on broadcasted signals from a base station, ensuring that a frequency precision of the output reference clock can be limited to a small range. Next, the executed EINT handler or software routine continuously monitors the statuses of all wireless communications modules (Step S1006), and checks whether all wireless communications modules are not in busy modes (Step S1007). When all wireless communications modules are not in busy modes, the clock source 904 may be deactivated to save battery power (Step S1008). Otherwise, the process may loop back to step S1005 to re-execute the AFC procedure.

Figure 10B:
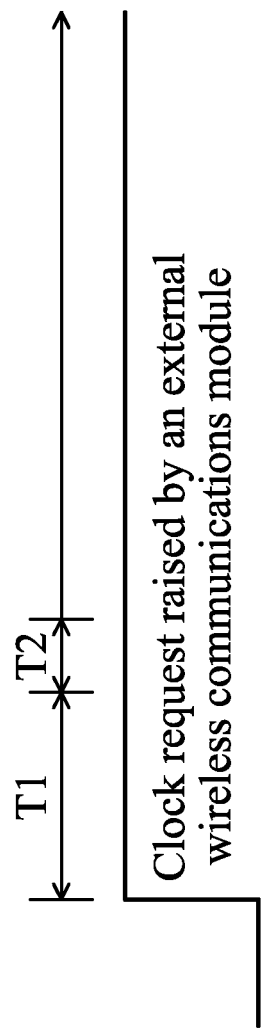
FIG. 10B shows an exemplary timeline for controlling the clock source when the VCXO is initially activated by an external wireless communications module.

FIG. 10B shows an exemplary timeline for controlling the clock source 904 when the VCXO is initially activated by an external wireless communications module. The time period T1 is called a clock settling time period for loading and executing the EINT handler or software routine, or other preparatory tasks. During the time period T2, the executed EINT handler or software routine controls capacitors of the VCXO. After the second time period T2, the reference clock has been stably generated and the AFC procedure may be repeatedly executed to maintain the output reference clock with a specific precision.

Figure 11:
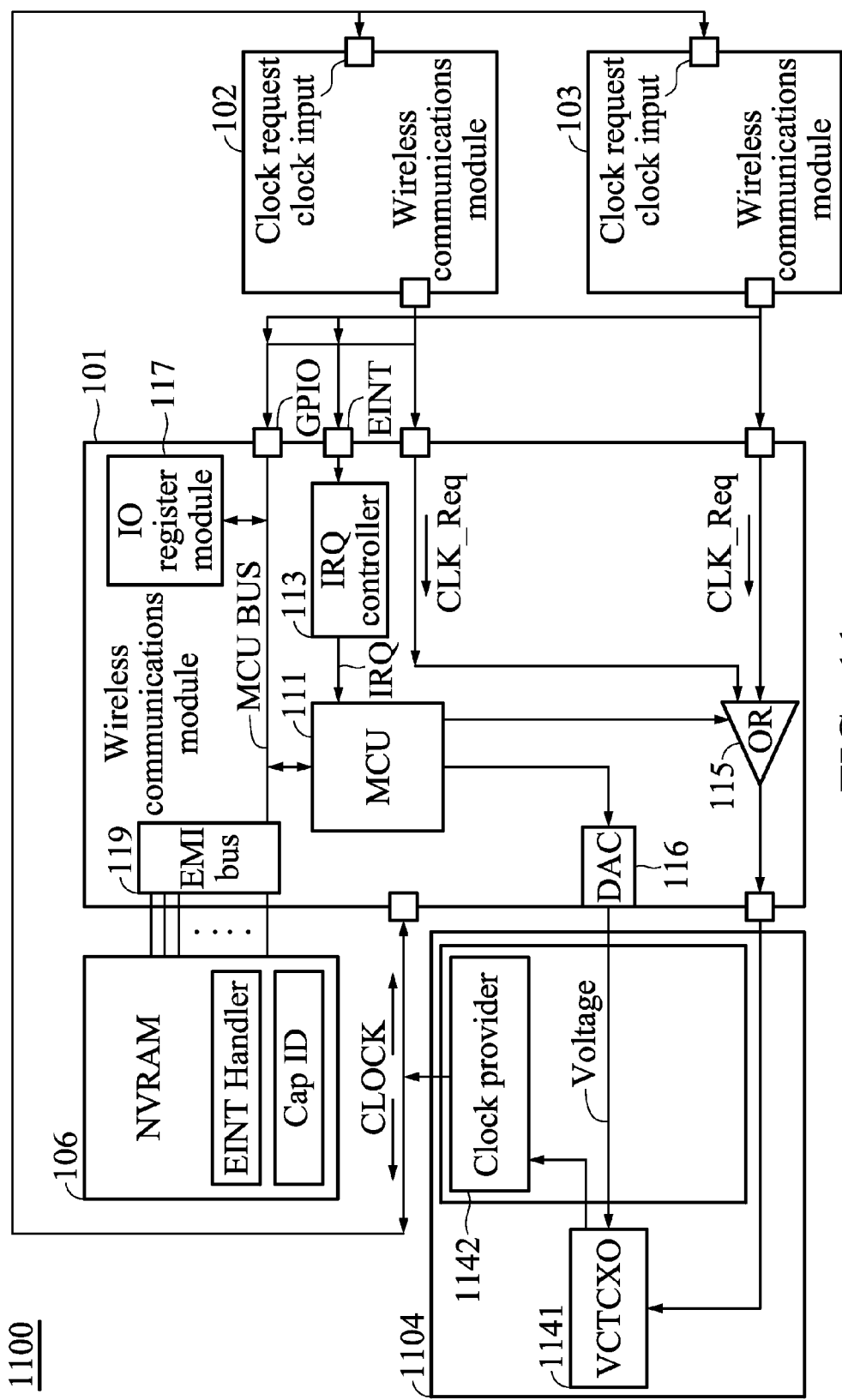
FIG. 11 shows a schematic diagram of a mobile electronic device according to another embodiment of the invention.

FIG. 11 shows a schematic diagram of a mobile electronic device 1100 according to another embodiment of the invention. In the embodiment of the invention, the clock source 1104 may contain at least a VCTCXO 1141 and a clock provider 1142, as shown in the lower-left part of FIG. 11. Other than the VCXO, the capacitance of VCTCXO 1141 is automatically adjusted and should not be changed by the wireless communications module 101. Similarly, the voltage to the VCTCXO may be adjusted (e.g. +/−0.1 ppm) by an executed EINT handler or software routine based on broadcasted signals from a base station, ensuring that a frequency precision of the output reference clock can be limited to a small range. It is to be understood that the adjustment command to the VCTCXO 1141 may be converted into a relevant voltage by a DAC 116.

Figure 12A:
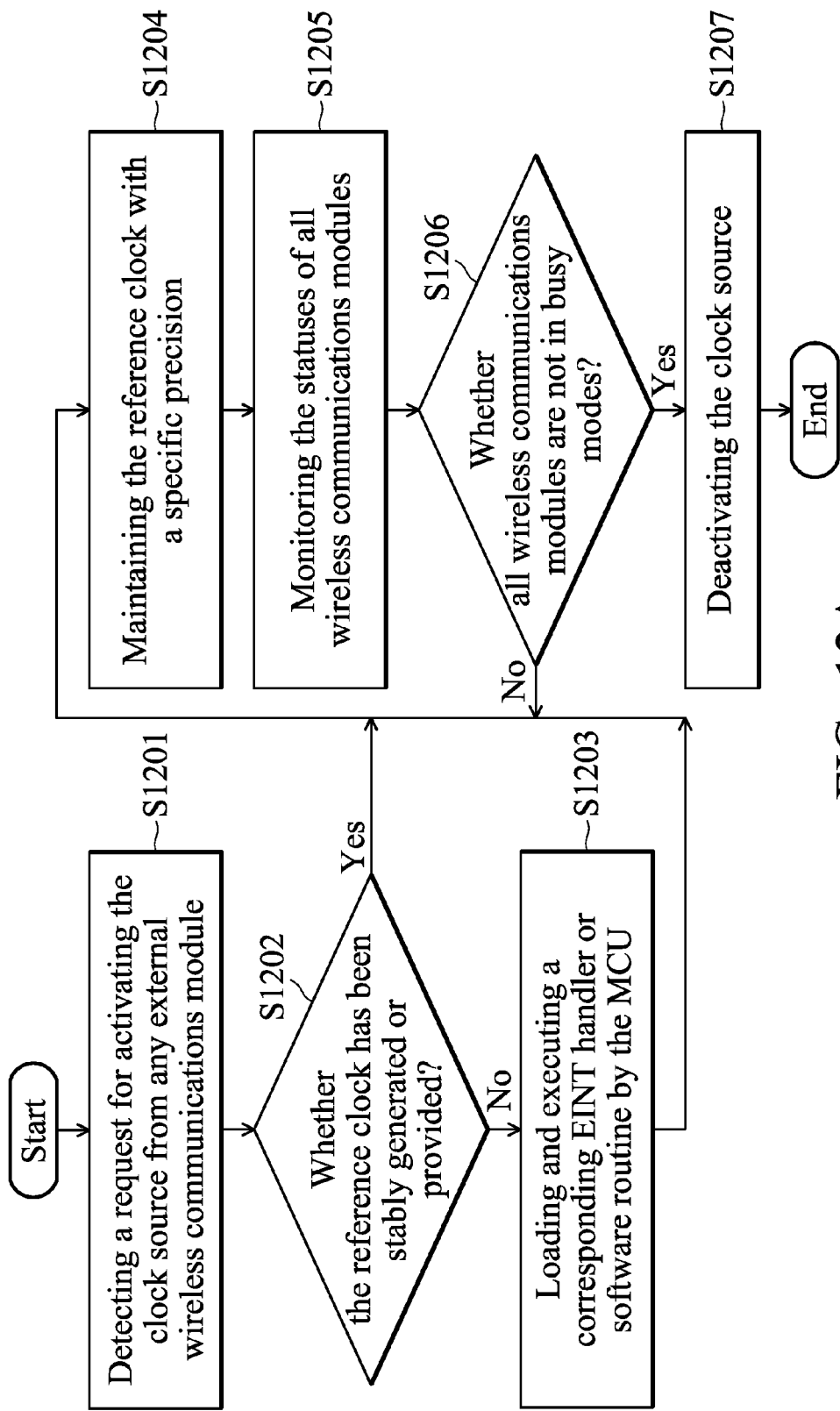
FIG. 12A shows the flow chart of a method for controlling the VCTCXO by the MCU of the first wireless communications module 101 according to an embodiment of the invention.

FIG. 12A shows the flow chart of a method for controlling the VCTCXO by the MCU 111 of the wireless communications module 101 according to an embodiment of the invention. After detecting a request to activate the clock source 1104 from any external wireless communications module 102 or 103 via the EINT or GPIO interface (Step S1201), the MCU 111 of the wireless communications module 101 determines whether the reference clock has been stably generated or provided by the clock source (Step S1202). When the reference clock has not been stably generated or provided by the clock source 1104, meaning that the clock source 1104 has been initially activated by the external wireless communications module 102 or 103 to provide the reference clock, the MCU 111 loads and executes a corresponding EINT handler or software routine, or others, which is stored in the NVRAM (Step S1203). When the reference clock has been stably generated or provided, meaning that the clock source 1104 has already provided a stable reference clock to any other wireless communications module (i.e. any wireless communications module other than the one that is making the request), an AFC procedure may continue to maintain the reference clock with a specific precision until all of the wireless communications modules leave the busy modes (Step S1204). It is to be understood that the reference clock has been stably generated when it is output with a designated frequency varied within a small range. In the AFC procedure, the voltage of the VCTCXO may be periodically adjusted based on broadcasted signals from a base station, ensuring that frequency precision of the output reference clock can be limited to a small range. Next, the executed EINT handler or software routine continuously monitors the statuses of all wireless communications modules (Step S1205), and checks whether all wireless communications modules are not in busy modes (Step S1206). When all wireless communications modules are not in busy modes, the clock source 1104 may be deactivated to save battery power (Step S1207). Otherwise, the process may loop back to step S1204 to re-execute the AFC procedure.

Figure 12B:
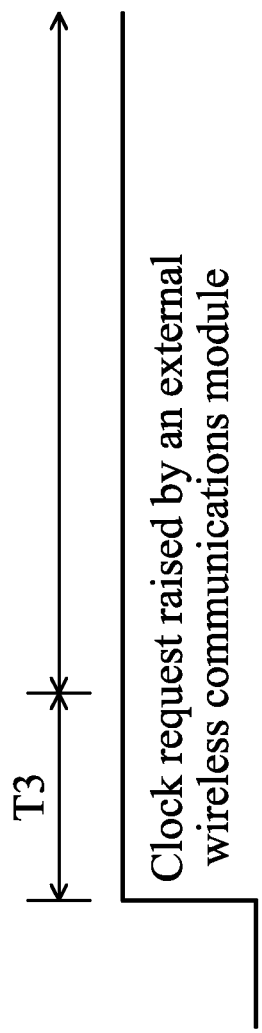
FIG. 12B shows an exemplary timeline for controlling the clock source when the VCTCXO is initially activated by an external wireless communications module.

FIG. 12B shows an exemplary timeline for controlling the clock source 1104 when the VCTCXO is initially activated by an external wireless communications module 102 or 103. The time period T3 is the clock settling time period for loading and executing the EINT handler or software routine, or other preparatory tasks. After the time period T3, the AFC procedure may be repeatedly executed to maintain the output reference clock with a specific precision.

Figure 13:
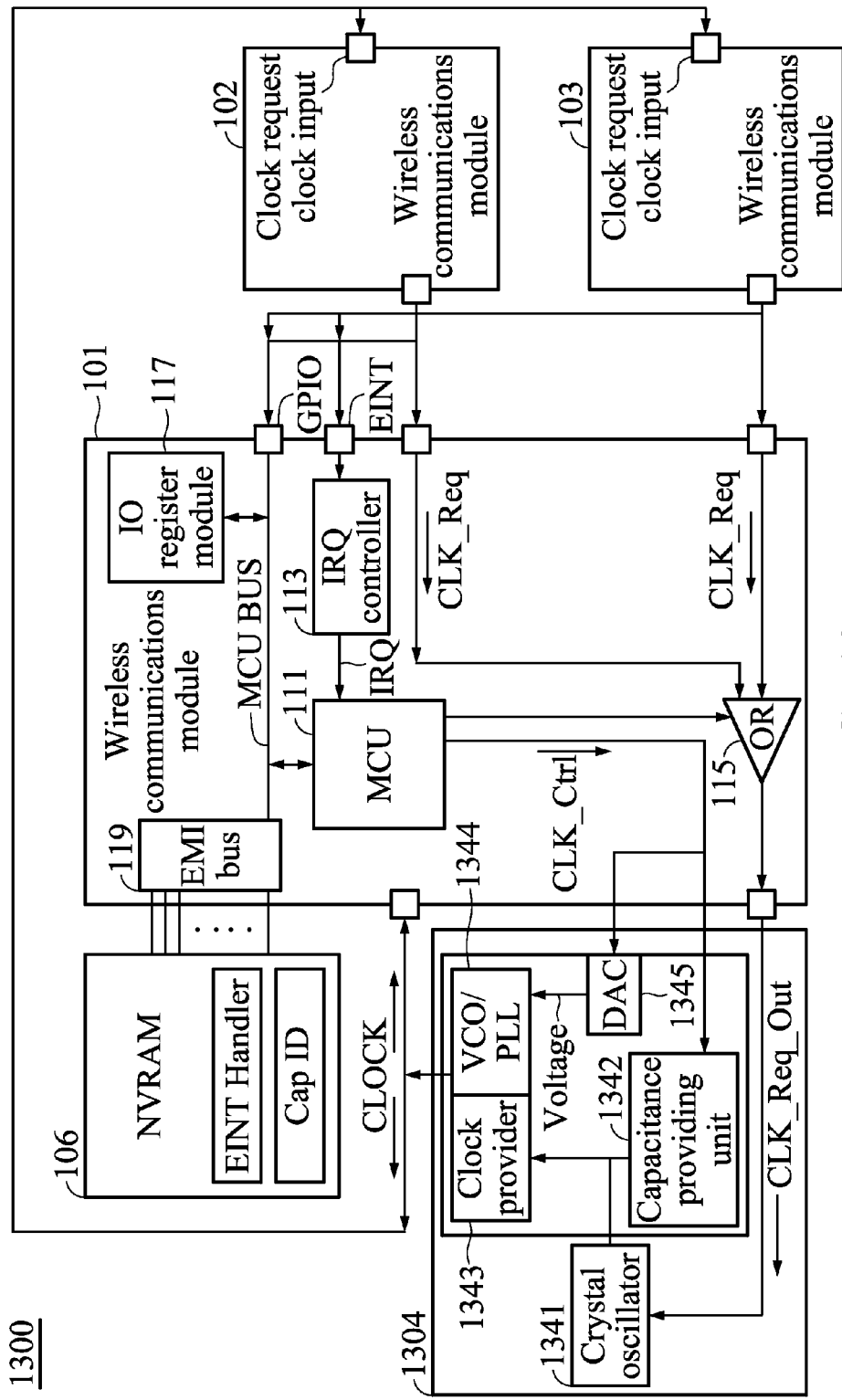
FIG. 13 shows a schematic diagram of a mobile electronic device 1300 according to another embodiment of the invention.

FIG. 13 shows a schematic diagram of a mobile electronic device 1300 according to another embodiment of the invention. In the embodiment of the invention, the clock source 1304 may be implemented in a DCXO comprising a crystal oscillator 1341, a capacitance providing unit 1342, a clock provider 1343, a VCO/PLL 1344, and further comprising a digital interface and a DAC 1345 as shown in the lower-left part of FIG. 13. The digital interface receives digital commands from the MCU 111, and feeds them to the DAC 1345 to be converted into voltage for an AFC logic. The flow chart of the method for controlling the DCXO by the MCU 111 may be found in FIG. 10A, and the exemplary timeline when the DCXO is initially activated by an external wireless communications module may be found in FIG. 10B.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications apparatus, comprising:
 a first wireless communications module providing a first wireless communications service and communicating with a first communications device in compliance with a first protocol;
 a second wireless communications module providing a second wireless communications service and communicating with a second communications device in compliance with a second protocol; and
 a clock source shared by the first and the second communications modules and providing a reference clock to the first and the second communications modules,
 wherein the first wireless communications module detects a request from the second wireless communications module for activating the clock source, determines whether the reference clock has been stably generated by the clock source, and adjusts an electrical characteristic of the clock source to facilitate the reference clock output from the clock source to achieve a target frequency when the reference clock has not been stably generated.

2. The communications apparatus as claimed in claim 1, wherein the first wireless communications module avoids adjusting the electrical characteristic of the clock source when the reference clock has been stably generated.

3. The communications apparatus as claimed in claim 1, wherein a frequency of the reference clock is varied with the electrical characteristic of the clock source.

4. The communications apparatus as claimed in claim 1, wherein the electrical characteristic is a capacitance and/or a voltage of the clock source.

5. The communications apparatus as claimed in claim 2, wherein when the reference clock has been stably generated, the first wireless communications module maintains the reference clock with a specific precision by adjusting a voltage applied to a voltage controlled oscillator (VCO) or a phase locked loop (PLL) of the clock source based on broadcasted signals received from the first communications device.

6. The communications apparatus as claimed in claim 1, wherein the first wireless communications module comprises one or more external interrupt (EINT) and/or general purpose input output (GPIO) connections to interface with the second wireless communications module.

7. The communications apparatus as claimed in claim 6, wherein the second wireless communications module issues the request by triggering an external interrupt (EINT) via the EINT interface or sending a GPIO signal via the GPIO interface to notify the first wireless communications module that the clock source has been requested for activating.

8. The communications apparatus as claimed in claim 6, wherein the first wireless communications module further loads and executes an EINT handler or a software routine containing a series of software codes, and adjusts the electrical characteristic of the clock source through the executed EINT handler or the software routine.

9. The communications apparatus as claimed in claim 1, wherein the first wireless communications module adjusts the electrical characteristic of the clock source by adjusting a capacitance of the clock source to a relatively smaller value for a first time interval so as to reduce time for achieving the target frequency, and then adjusting the capacitance of the clock source to a relatively larger value for a second time interval so as to maintain the target frequency with a predetermined precision.

10. The communications apparatus as claimed in claim 1, wherein the second wireless communications module comprises an internal clock generator and distributor receiving the reference clock and adjusting the reference clock to appropriate clock rates required by the second wireless communications module.

11. A method executed by a first wireless communications module for controlling a clock source shared with at least a second wireless communications module comprising:
 detecting a request from the second wireless communications module for activating the clock source;
 determining whether a reference clock has been stably generated by the clock source; and
 avoiding adjusting an electrical characteristic of the clock source when the reference clock has been stably generated, wherein an adjustment to the electrical characteristic of the clock source facilitates the reference clock output from the clock source to achieve a target frequency.

12. The method as claimed in claim 11, further comprising:
adjusting the electrical characteristic of the clock source to make the reference clock output from the clock source to achieve the target frequency when the reference clock has not been stably generated.

13. The method as claimed in claim 11, wherein a frequency of the reference clock is varied with the electrical characteristic of the clock source.

14. The method as claimed in claim 11, wherein the electrical characteristic is a capacitance and/or a voltage of the clock source.

15. The method as claimed in claim 12, further comprising:
adjusting a voltage applied to a voltage controlled oscillator (VCO) or a phase locked loop (PLL) of the clock source based on broadcasted signals received from a first communications device communicating with the first wireless communications module to maintain the reference clock with a specific precision when the reference clock has been stably generated.

16. The method as claimed in claim 11, further comprising:
issuing the request by triggering an external interrupt (EINT) or sending a GPIO signal to notify the first wireless communications module that the clock source has been requested for activating.

17. The method as claimed in claim 16, further comprising:
loading and executing an EINT handler or a software routine containing a series of software codes when receiving the external interrupt or the GPIO signal; and
adjusting the electrical characteristic of the clock source through the executed EINT handler or the software routine.

18. The method as claimed in claim 11, wherein adjusting the electrical characteristic of the clock source further comprises:
adjusting a capacitance of the clock source to a relatively smaller value for a first time interval so as to reduce time for achieving the target frequency; and
adjusting the capacitance of the clock source to a relatively larger value for a second time interval so as to maintain the target frequency with a predetermined precision.

19. A communications apparatus, comprising:
a clock source providing a reference clock;
a first wireless communications module comprising:
an interface; and
a micro controller unit coupled to the interface; and
a second wireless communications module notifying the first wireless communications module that the clock source has been requested for activating via the interface of the first wireless communications module,
wherein the micro controller unit detects the reference clock, determines whether to adjust an electrical characteristic of the clock source to facilitate the reference clock to achieve a target frequency with reference to the detected reference clock after receiving the notification from the second wireless communications module, and adjusts the electrical characteristic of the clock source in terms of the determination.

20. The communications apparatus as claimed in claim 19, wherein the micro controller unit further determines to adjust a capacitance of the clock source to facilitate the reference clock to achieve the target frequency when the reference clock has not been stably generated.

21. The communications apparatus as claimed in claim 19, wherein the micro controller unit further determines not to adjust a capacitance of the clock source when the reference clock has been stably generated, in which an adjustment to the capacitance facilitates the reference clock to achieve the target frequency.

* * * * *